No. 777,131. Patented December 13, 1904.

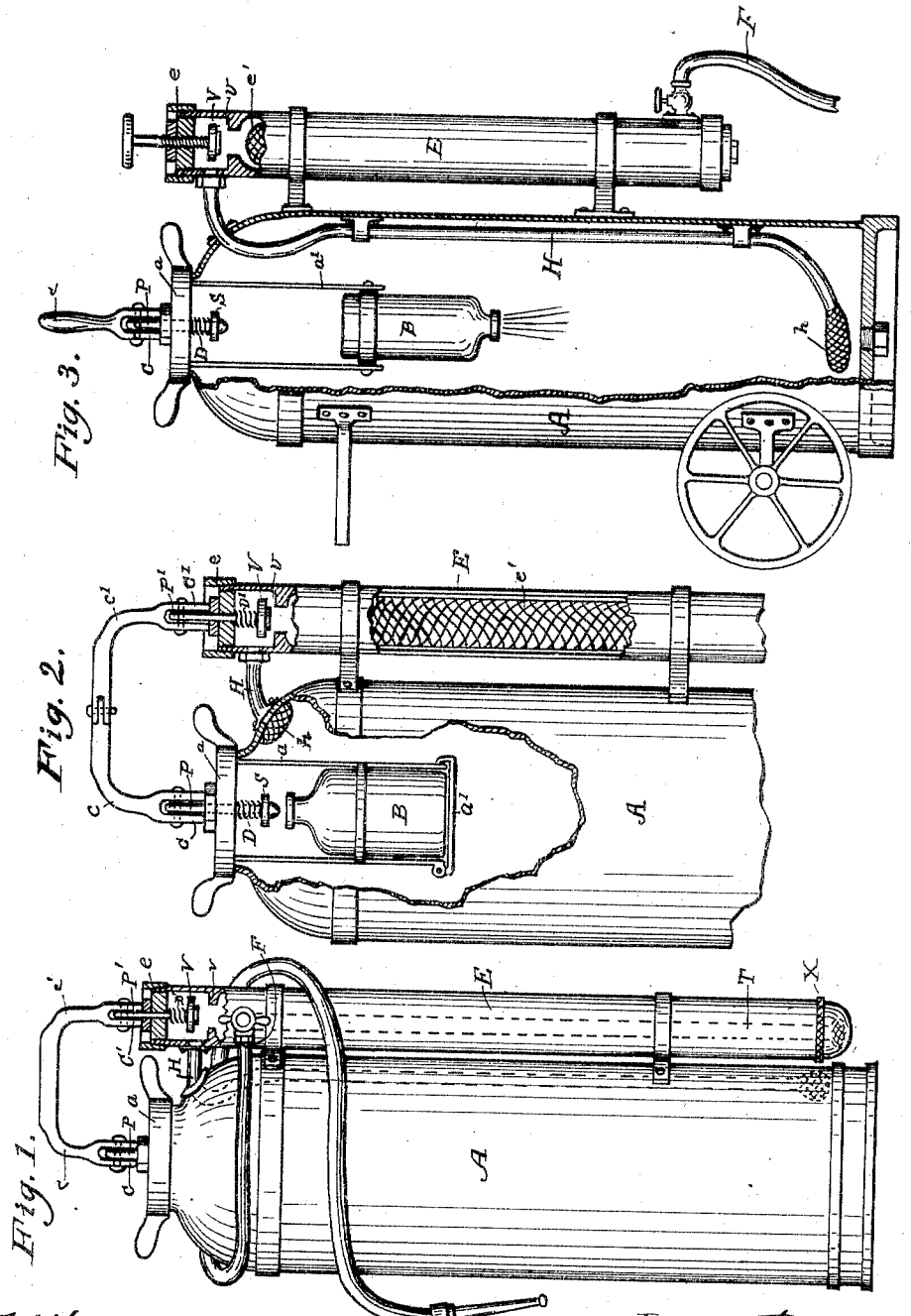

UNITED STATES PATENT OFFICE.

CHARLES NUHRING, OF CINCINNATI, OHIO.

PORTABLE FIRE-EXTINGUISHER.

SPECIFICATION forming part of Letters Patent No. 777,131, dated December 13, 1904.

Application filed October 20, 1903. Serial No. 177,756. (No model.)

*To all whom it may concern:*

Be it known that I, CHARLES NUHRING, a citizen of the United States, residing at Cincinnati, in the county of Hamilton and State of Ohio, have invented new and useful Improvements in Portable Fire-Extinguishers, of which the following is a specification.

My invention relates to portable fire-extinguishers so designed as to be adapted for quick and ready use in extinguishing fires before they shall have gained dangerous headway.

My improvements may be applied to all forms of fire-extinguishers in which a body of water in a containing tank or vessel is designed to be forced out by a gas generated in the tank at the time and place of use. Such apparatus consists usually of a closed tank containing separately water, an acid, and an alkaline salt in such relation as to be mingled only in the act of using, whereby at such times a gas, such as carbonic acid, is set free and partly absorbed by the water, while the excess furnishes the pressure to discharge the contents of the tank. All the present devices designed to do this class of work are more or less defective in that the contents of the acid-container, as well as the chemical crystals or so-called "cartridge," are likely to come into contact with the water contained in the tank before the apparatus is ready for use. In the present state of the art all such devices are so constructed that if the tank and contents were quickly carried from one place to another or even a few feet contact with the water of either the acid or the dry chemical, or both, would be almost certain if the vessel were properly filled with water, as the motion of ordinary walking might cause sufficient slopping to effect this end, and hurried or careless movements certainly would. Now when it is considered that there is ordinarily attendant upon incipient fires much excitement and there would consequently be careless handling of fire-extinguishers it will be seen that such undesirable results as before mentioned would be the rule. Immediately upon the acid and chemical water coming in contact gas is generated and pressure is produced which would cause a flow of water into the compartment containing the alkaline salt, and more gas would be generated there, which unless liberated by the turning on of the nozzle-valve, if there be one, would cause the explosion of an ordinary tank, or if there should be no nozzle-valve then a flow of chemicalized water would result whether it was found to be needed or not; but even if the flow was checked and the tank stood the pressure the efficiency of the apparatus would be lost until it was recharged, and as ordinary users would not be able to know what condition contents of tank were in and would not, therefore, ordinarily recharge device if it had not been actually used, at the next alarm, when the apparatus was needed, it would be found to be without efficiency.

My present improvements make it possible to convey the apparatus charged ready for use from one place to another without care in handling and with absolute security against mixing the contents of the different compartments and after operation of device has been begun to temporarily suspend action by closing receptacle for dry chemical against liquid contents of tank. Thus to the beneficial features of this type of apparatus, including thoroughly impregnating the water with chemical constituents deleterious to combustion, I add facility of handling and certainty of operation.

My apparatus may be constructed with the tube which is to contain the soluble chemical substances either inside of the main tank or in the form of a separate tube attached to the exterior of the tank.

My invention is illustrated in preferred form in the accompanying drawings, in which—

Figure 1 is an interior side elevation of a portable fire-extinguisher, showing the means by which my improvements are operated. Fig. 2 is a similar view with parts of the tank and tube broken away to show operative portions of my improvements. Fig. 3 shows a side elevation of a tank mounted on wheels, which shows alternative construction and independent means of operating my improvements.

Referring now to the drawings, A designates a cylindrical tank used in the ordinary type of portable fire-extinguishers. It is provided with an opening at the top, closed by a tight-fitting screw-cap $a$, from which is suspended by any suitable design of frame $a'$ a bottle B, containing a suitable acid, arranged so that after stopper is raised it will either tip itself and discharge its contents or mingle its contents with the surrounding liquid when the tank is inverted; but so long as the stopper S is held in place by the spring D, which is preferably coiled about the plunger P, holding stopper normally depressed, the contents of the acid-bottle are protected from seepage into or out of the same even when submerged in the surrounding liquid. The outer portion of the plunger is so attached to the cam C that upon the rotation of the cam by its lever $c$ the plunger and attached stopper is raised and the spring compressed.

At some suitable point within the tank, either top or bottom, is the customary outlet-hose H and its strainer $h$. This outlet extends into a relatively small tubular casing E, preferably entering same at the top, where provision is made for a valve V and a valve-seat $v$, provided with plunger $p'$, spring D', cam C', and its attendant lever $c'$, all of which are operated as is the stopper-valve and its valve-seat (the bottle-neck) heretofore described. Thus the flow of water from the tank into the tubular casing may be and normally is completely shut off.

Both cams may be operated at one time by means of a connected lever, as shown in Fig. 1, or the lever may be operable separately or together, as shown in Fig. 2, where they are pinned or coupled together, or the operation may be entirely separate, as shown in Fig. 3.

Tubular casing E is provided with an opening at its top, closed by a tight-fitting screw-cap $e$, through which plunger extends. Within the tubular casing E is usually placed a smaller perforated casing $e'$, ordinarily a cylinder of wire gauze or netting, filled with the desired chemical substances in a more or less pulverized or granular condition, so as to be readily dissolved by liquid passing outwardly through the casing E to the hose F.

In Fig. 1 is shown an alternative form of construction with dotted lines indicating that a perforated disk X separates the upper part of the casing from the bottom, and through this disk extends a tube T, open below the disk and extending out and connecting with the hose F. In this construction no inner casing is used, but the dry chemical is placed in the casing E, so that the liquid contents of the tank A percolates down through the chemical and perforated disk and is forced out through the tube T and hose F chemically charged.

The ordinary contents of the tank A are water containing bicarbonate of soda, to which the hydrochloric or other suitable acid is added from the bottle, generating carbonic-acid gas, most of which rises through the water and by its accumulated pressure forces out the liquid of the tank into the casing E, where it dissolves and takes up the chemicals therein, such as sal-ammoniac, which, being acted upon by the heat of combustion, liberates other gases in contact with the burning material, that tend to quench combustion.

In Fig. 3 is shown a larger tank A, mounted on wheels, for use by fire-departments, factories, public institutions, and the like. The construction and operation are the same as in the smaller devices. Valves may be operated by threaded shaft, as shown in Fig. 3, instead of cam motion, but would be less rapidly handled.

In all cases after use the receptacle for dry liquid may be refilled and the acid-bottle refilled and charged for another emergency.

I claim as my invention and desire to secure by Letters Patent of the United States—

1. The combination with a tank provided with liquid and a holder containing an acid which generates a discharging pressure when brought into contact with the liquid, of a receptacle connected to the tank and containing soluble dry chemicals, a spring-pressed valve in the holder between the chemicals and the point where the liquid enters from the tank, a spring-pressed valve forming a closure for the acid-holder, cams connected to the stems of the valves, and means whereby the cams are operated to open the valves at the instant of use to allow the liquid contents of the tank to enter the holder.

2. The combination with the water-tank and the acid-holder supported therein, of a receptacle connected with the tank and containing soluble dry chemicals, a spring-pressed stopper normally closing the mouth of the acid-holder, a spring-pressed valve in the receptacle and normally closing the entrance to the chemicals, and means connected to the stems of the valves and imparting coördinate movements thereto.

3. The combination with the water-tank and the acid-holder supported therein, of a receptacle connected with the tank and containing soluble dry chemicals, a spring-pressed stopper normally closing the mouth of the acid-holder, a spring-pressed valve in the receptacle and normally closing the entrance to the chemicals, cams connected to the stems of the stopper and valve, and a rocking connection between said cams for imparting coördinate movements thereto.

In testimony whereof I have hereunto set my hand in presence of two subscribing witnesses.

CHARLES NUHRING.

Witnesses:
CHAS. HERBERT JONES,
JOSEPH R. GARDNER.